(12) United States Patent
Petersen et al.

(10) Patent No.: US 10,394,492 B2
(45) Date of Patent: Aug. 27, 2019

(54) SECURING A MEDIA STORAGE DEVICE USING WRITE RESTRICTION MECHANISMS

(71) Applicant: Lenovo Enterprise Solutions (Singapore) Pte. Ltd., Singapore (SG)

(72) Inventors: John Michael Petersen, Wake Forest, NC (US); Gary David Cudak, Wake Forest, NC (US); Shareef Fathi Alshinnawi, Apex, NC (US); Ajay Dholakia, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 120 days.

(21) Appl. No.: 15/335,290

(22) Filed: Oct. 26, 2016

(65) Prior Publication Data
US 2018/0113638 A1  Apr. 26, 2018

(51) Int. Cl.
*G06F 12/00* (2006.01)
*G06F 3/06* (2006.01)
*G06F 12/14* (2006.01)

(52) U.S. Cl.
CPC .......... *G06F 3/0673* (2013.01); *G06F 3/0619* (2013.01); *G06F 3/0659* (2013.01); *G06F 3/0683* (2013.01); *G06F 12/14* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 7,395,377 B2* | 7/2008 | Gill | ...................... | G06F 12/0804 711/141 |
| 2008/0244747 A1* | 10/2008 | Gleichauf | ........... | G06F 11/1415 726/25 |
| 2013/0312098 A1* | 11/2013 | Kapoor | ................. | G06F 21/554 726/24 |
| 2015/0234751 A1* | 8/2015 | Van Der Sluis | ...... | H04L 9/0866 713/193 |

(Continued)

OTHER PUBLICATIONS

Kitaichik, J., "A Different View: Understand and Prevent Encrypting Ransomware," Palo Alto Networks, Jan. 7, 2015, pp. 1-5, retrieved from http://researchcenter.paloaltonetworks.com/2015/01/different-view-understand-prevent-encrypting-ransomware/.

(Continued)

*Primary Examiner* — John A Lane
(74) *Attorney, Agent, or Firm* — Zilka-Kotab, P.C.

(57) ABSTRACT

According to one embodiment, a system includes a media storage device, a processor, and logic integrated with and/or executable by the processor. The logic is configured to cause the processor to determine a write rate for the media storage device or a portion thereof based on one or more factors, the write rate ranging from zero to a maximum possible write rate for the media storage device or the portion thereof. The logic is also configured to cause the processor to receive a write request to write data to the media storage device or the portion thereof and write the data to the media storage device using the determined write rate. Other systems, methods, and computer program products for defending against ransomware attacks are presented according to more embodiments.

18 Claims, 4 Drawing Sheets

(56) References Cited

U.S. PATENT DOCUMENTS

| | | | | |
|---|---|---|---|---|
| 2016/0103626 | A1* | 4/2016 | Hars | G06F 12/1408 |
| | | | | 711/103 |
| 2017/0093863 | A1* | 3/2017 | Galtsev | H04L 63/10 |
| 2017/0099311 | A1* | 4/2017 | Kesin | G06N 7/005 |
| 2017/0359370 | A1* | 12/2017 | Humphries | H04L 63/1441 |
| 2018/0121372 | A1* | 5/2018 | Lyon | G06F 12/1425 |
| 2018/0253243 | A1* | 9/2018 | Shenoy | G06F 3/0623 |

OTHER PUBLICATIONS

Zeltser, L., "How Would You Detect and Impede Ransomware on an Endpoint?," Lenny Zeltser, May 20, 2016, pp. 1-5, retrieved from https://zeltser.com/detect-impede-ransomware/.

Chirgwin, R., "Michigan electricity utility downed by ransomware attack," The Register, May 3, 2016, pp. 1-4, retreived from http://www.theregister.co.uk/2016/05/03/michigan_electricity_utility_downed_by_ransomware_attack/.

* cited by examiner

SECURING A MEDIA STORAGE DEVICE USING WRITE RESTRICTION MECHANISMS

FIELD OF THE INVENTION

The present invention relates to data security, and more particularly to providing security to data stored to media storage devices from ransomware using write restriction mechanisms.

BACKGROUND

Ransomware is a quickly developing form of malware, in which the attacker gains access to a user's data, typically through a phishing scam or some other method of having an authorized user deploy the malware within the network. Then, the malware encrypts the user's data using strong encryption. Once the data has been encrypted, the attacker contacts the user and extorts money from the user in order to decrypt the user's data. In short, the attacker demands money in exchange for the decryption key for the strong encryption that was used to encrypt the user's data. This type of attack affects many thousands of users and corporations per year. Moreover, and more troubling, the prevalence of ransomware attacks is rising rapidly due to its simple concept and deployment.

There have been many instances of ransomware attacks in the near past. For example, the Board of Water and Light in Lansing, Mich., was recently attacked by ransomware. The Board of Water and Light first noticed the attack on Apr. 25, 2016, but was not able to fully recover from the attack for over a week, costing money and time.

Once a user's data is encrypted, it is entirely inaccessible, and the only ways to gain access to the user's data is to pay for the decryption key, which is undesirable and promotes ransomware attacks, to decode the encryption which is unrealistic and overtly time-consuming for most victims of ransomware attacks, or to retrieve a most recent copy of the user's data from a backup file. However, many users and organizations do not maintain backups diligently or keep them current enough to help in a ransomware attack. The user and/or organization will usually be completely unaware that an encryption process of a ransomware attack is running until it is too late to stop the encryption process and save the user's data.

SUMMARY

According to one embodiment, a system includes a media storage device, a processor, and logic integrated with and/or executable by the processor. The logic is configured to cause the processor to determine a write rate for the media storage device or a portion thereof based on one or more factors, the write rate ranging from zero to a maximum possible write rate for the media storage device or the portion thereof. The logic is also configured to cause the processor to receive a write request to write data to the media storage device or the portion thereof and write the data to the media storage device using the determined write rate.

In another embodiment, a computer program product includes a computer readable medium having stored thereon computer readable program instructions executable by a processor to cause the processor to perform a method. The method includes determining a write rate for a media storage device or a portion thereof based on one or more factors, the write rate ranging from zero to a maximum possible write rate for the media storage device or the portion thereof. The method also includes receiving a write request to write data to the media storage device or the portion thereof and writing the data to the media storage device using the determined write rate.

In yet another embodiment, a computer-implemented method includes determining a write rate for a media storage device or a portion thereof based on one or more factors, the write rate ranging from zero to a maximum possible write rate for the media storage device or the portion thereof. The method also includes receiving a write request to write data to the media storage device or the portion thereof and writing the data to the media storage device using the determined write rate.

Other aspects, features, and embodiments of the presently disclosed inventive concepts will be appreciated from reviewing the following detailed descriptions, figures, and claims in full detail. The descriptions and figures are provide for illustrative purposes and should be understood as not limiting on the scope of the inventive concepts disclosed herein.

DETAILED DESCRIPTION

Figure 1:
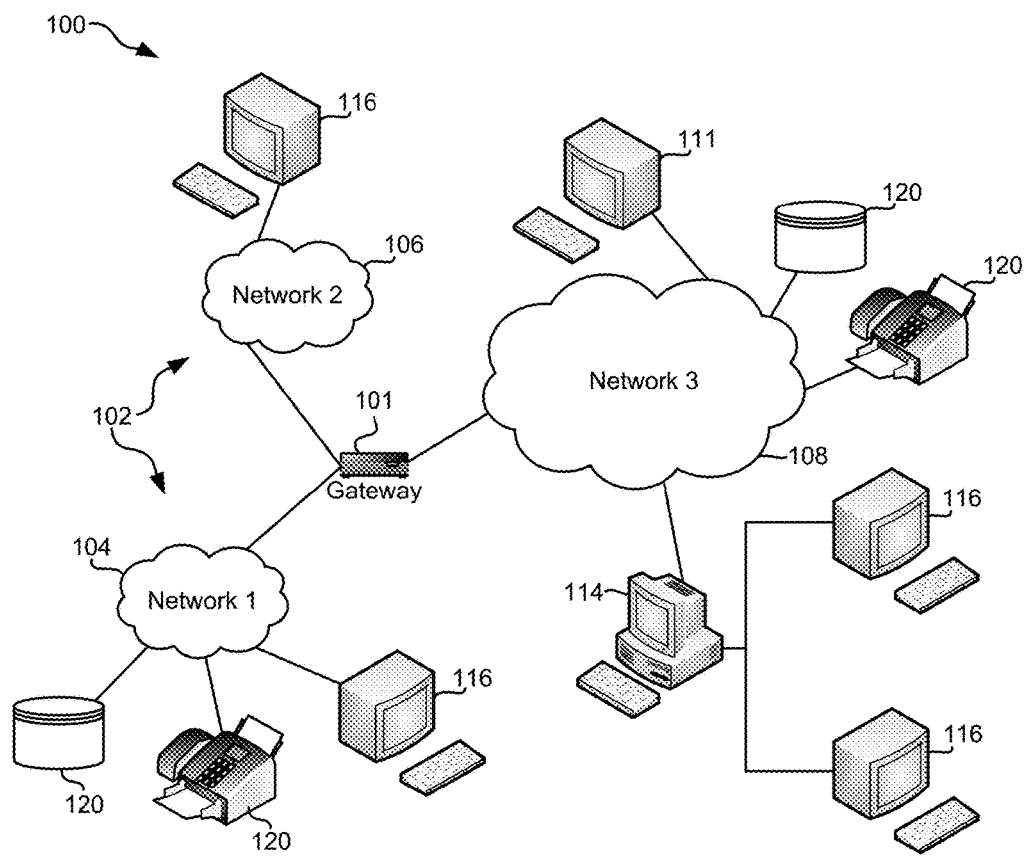
FIG. 1 illustrates a network architecture, in accordance with one possible embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Generally, the presently disclosed inventive concepts relate to defending against ransomware attacks on devices and systems using one or more write restriction mechanisms.

Thus, in one general embodiment, a system includes a media storage device, a processor, and logic integrated with and/or executable by the processor. The logic is configured to cause the processor to determine a write rate for the media storage device or a portion thereof based on one or more factors, the write rate ranging from zero to a maximum possible write rate for the media storage device or the portion thereof. The logic is also configured to cause the processor to receive a write request to write data to the media storage device or the portion thereof and write the data to the media storage device using the determined write rate.

In another general embodiment, a computer program product includes a computer readable medium having stored thereon computer readable program instructions executable by a processor to cause the processor to perform a method. The method includes determining a write rate for a media storage device or a portion thereof based on one or more factors, the write rate ranging from zero to a maximum possible write rate for the media storage device or the portion thereof. The method also includes receiving a write request to write data to the media storage device or the portion thereof and writing the data to the media storage device using the determined write rate.

In yet another general embodiment, a computer-implemented method includes determining a write rate for a media storage device or a portion thereof based on one or more factors, the write rate ranging from zero to a maximum possible write rate for the media storage device or the portion thereof. The method also includes receiving a write request to write data to the media storage device or the portion thereof and writing the data to the media storage device using the determined write rate.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input, and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other figures. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer, or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
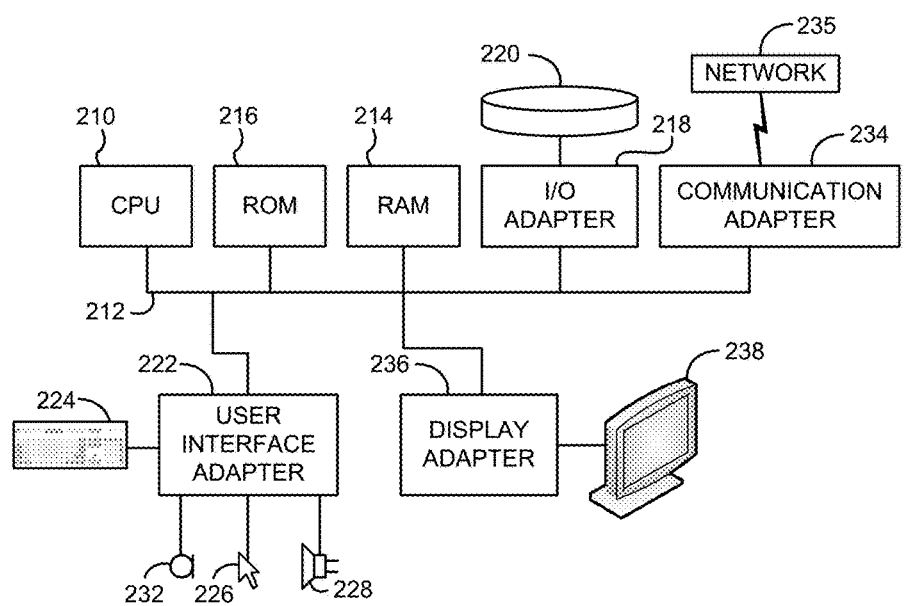
FIG. 2 illustrates an exemplary system, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.ee Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Networks, mainframes, servers, hosts, and other computing devices typically store data on media storage devices, such as hard disk drives (HDDs), optical drives, solid state drives (SSDs), magnetic tape drives, etc. Any type of media storage device may be used to store data, such that it is accessible to users when requested. However, it is not appropriate nor advisable to let anyone access the data that is stored to these media storage devices without first determining whether they are authorized to have such access. Malicious actors may attempt to access the data without authorization, which may cause data to be moved, overwritten, deleted, and/or encrypted when the malicious actor has write access to the data.

In order to protect data that is stored to a media storage device, a subset of storage space (such as one or more sectors) on the media storage device may be assigned to a specific application, thereby eliminating the ability for other applications to make write requests to that subset of storage space, including ransomware.

This protection may be applied to end-user computing devices that utilize media storage devices, such as laptop computers, tablet computers, smartphones, enterprise computing systems, etc. This protection may, in another approach, be applied to a network that includes many media storage devices that are accessible from a plurality of terminals or consoles, such that data stored to the media storage devices is protected from unauthorized access across many different platforms.

Figure 3:
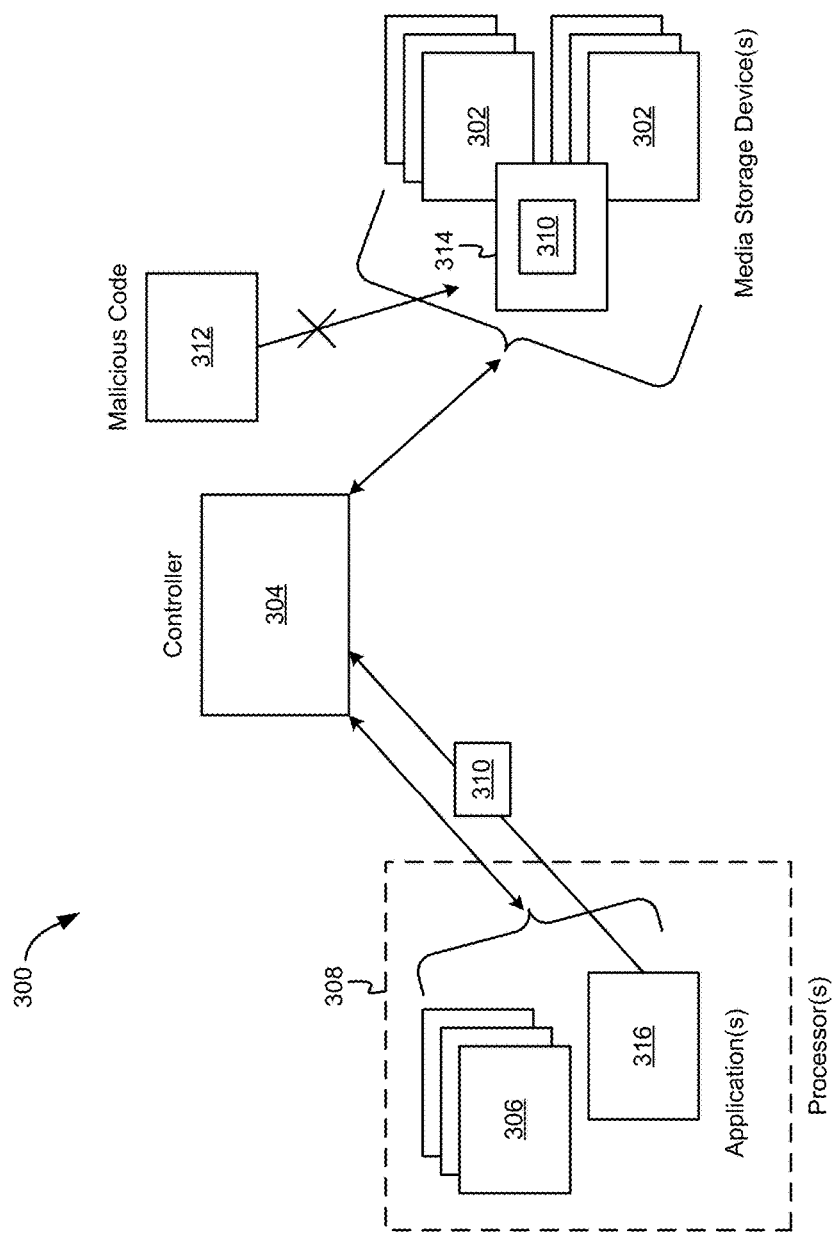
FIG. 3 illustrates a system in accordance with one embodiment.

Now referring to FIG. 3, a system 300 is shown which may be utilized in the context of the embodiments described herein. The system 300 includes one or more media storage devices 302, a controller 304, and one or more applications 306 operating on at least one processor 308. The controller 304 is in electrical communication with the one or more media storage devices 302 and the one or more applications 306 operating on the at least one processor 308. In one embodiment, the controller 304 may be a hardware device having at least one hardware processor, a memory in communication with the hardware processor, and an interface that enables communication between the hardware processor, the one or more media storage devices 302, and the one or more applications 306 operating on the at least one processor 308.

In another embodiment, the controller 304 may be a software routine, function, logic, etc., that is configured to interact with the one or more media storage devices 302 and the one or more applications 306 operating on the at least one processor 308.

In yet another embodiment, the controller 304 may be a component of a first media storage device 314, such that the controller 304 is configured to manage data storage and retrieval to/from the first media storage device 314. For example, the controller 304 may be a storage controller of the first media storage device 314 that is configured to receive data to be stored, send data that is requested, and manipulate data stored to the storage space of the first media storage device 314.

Any hardware processors of a type known in the art may be used to operate the controller 304 and as the at least one processor 308 executing the one or more applications 306, such as CPUs, ASICs, FPGAs, ICs, microprocessors, hardware chips having logic stored thereon, etc.

In one embodiment, the one or more applications 306 request that data 310 be stored on at least one of the one or more media storage devices 302, via the controller 304 or directly to at least one of the one or more media storage devices 302 (and the controller receives indication of this write request and data 310 being written). This data 310 is prone to being accessed by an unauthorized actor 312, such as malware, and specifically ransomware.

As used herein, "access" may refer to writing new data to available storage space on a media storage device, overwriting previously stored data on a media storage device, reading previously stored data from a media storage device, moving previously stored data on a media storage device to another location on the media storage device or to a different media storage device, and/or deleting previously stored data from a media storage device. In specific embodiments, "access" refers to writing data (whether new data or overwriting existing data) to a media storage device, as this writing of encrypted data (over existing unencrypted data) is a primary function of ransomware, that if defeated, would prevent the ransomware from accomplishing its malicious goals.

In another embodiment, the unauthorized actor 312 may request that data 310 be stored on at least one of the one or more media storage devices 302, such request being intercepted by the controller 304 or provided thereto in a normal write request for one of the one or more media storage devices 302. In this case, the data 310 would typically be corrupt, encrypted, or in some other way cause data already stored to one or more media storage devices 302 to become unusable. Therefore, it is desirable to prevent this type of write request from being executed on the one or more media storage devices 302.

Therefore, in order to protect the security of the one or more media storage devices 302, along with any data stored thereto, and prevent unauthorized actors 312 from accessing such stored data or write data of their choosing on (and possibly overwrite data already stored on) one of the one or more media storage devices 302, in one embodiment, the controller 304 is configured to determine malicious write attempts when they are received based on one or more factors. These malicious write attempts may be issued from the unauthorized actor 312 or from one or more of the applications 306, in various embodiments.

In one embodiment, the controller 304 is configured to assign a write and overwrite rate (which may be a single overall write rate or separate rates depending on whether the request is to write new data to unoccupied space or overwrite existing data, hereinafter referred to as a "write rate") to each of the applications 306, thereby restricting the rate at which each application 306, such as the first application 316, is able to write data to the one or more media storage devices 302. A write rate, as used herein, describes an amount of data that is written to a particular media storage device, such as the first media storage device 314, or a portion thereof, over a given time period. For example, write rates may be notated in megabytes of data written per second (MB/sec), kilobytes of data written per second (KB/sec), kilobytes of data written per millisecond (KB/ms), gigabytes of data written per minute (GB/min), etc. Any time period may be used for calculation of the write rate, with shorter time periods being preferred to ensure that any malicious activity is able to be quickly stopped or restricted without an extensive (and possibly irreversible) amount of damage done to data stored to the one or more media storage devices 302.

In various embodiments, a single write rate may be applied to all write requests issued by the applications 306 (and any other actors such as the unauthorized actor 312), a write rate may be applied to write requests from a group of applications that is different from one or more write rates applied to other applications of the one or more applications 306, a particular write rate may be individually applied to each of the one or more applications 306, etc.

By restricting the write rate, including completely restricting writing in any form (a write rate of zero), the amount of harm that may result from data being written or overwritten on the one or more media storage devices 302 may be limited or prevented entirely.

In one embodiment, the write rate assigned to any particular application, such as the first application 316, may be based on one or more characteristics of the first application 316, a particular subset of storage space, a media storage device that is a target of the write request, and/or the write request, such as an historical write rate for the particular subset of storage space on a first media storage device 314, an amount of overwriting that has historically taken place due to write requests from the first application 316, a time at which the write request is received, historical times in which data is written or overwritten on a particular media storage device and/or by a particular application, a pattern of write requests received from the first application 316, which portion of the media storage device the write request is requesting data to be written to, etc.

In another embodiment, the write rate may be assigned to each subset of storage space dependent upon a time period in which the write request is received. Typically, most write requests are received during business hours while users are interacting with data stored to the one or more media storage devices 302. Therefore, when write requests are received outside of time periods in which write requests are normally received (e.g., off-peak hours, non-business hours, etc.), when taking into account previously scheduled and authorized maintenance and/or updating processes, these write requests may be restricted and/or suspended until approval is received from an authorized user for these write requests to continue unrestrained. In this way, the amount of damage and/or harm that may be caused by a ransomware attack may be minimized or prevented without inhibiting authorized processes and writes that should be occurring during normal operating hours.

In yet another embodiment, specific storage space subsets on one or more media storage devices 302 may have maximum write rates (which includes a write rate of zero) predetermined prior to ever receiving a write request for such specific storage space subsets. This embodiment may be used to protect OS files, application files, or other sensitive data that should rarely, if ever, be written to or overwritten. In this way, malicious code may be prevented from causing damage or harm that cannot be reversed in areas of the media storage devices 302 which typically and historically do not have write requests issued.

According to several embodiments, periods of activity tolerance and/or access limits may be assigned, by an authorized user, to at least one subset of storage space (e.g., a sector, a track, a block, etc.) on at least one media storage device, such as the first media storage device 314. These periods of activity tolerance provide for times in which activity (e.g., data access) is expected on the first media storage device 314. In one embodiment, the authorized user may configure the periods of activity tolerance that are expected for each media storage device 302 and/or for each application 306. In an alternate embodiment, the periods of activity tolerance that are expected for each media storage device 302 and/or for each application 306 may be computed by the controller 304 based on user profile(s).

In another embodiment, in-use write rates may be defined and applied for any user or application 306 that is issuing write requests for the one or more media storage devices 302. When a user exceeds an expected write rate, attempts to write to an unexpected location on the one or more media storage devices 302, or exhibits a pattern of writing (indicative of encryption processing) that is outside of those dictated by the user profile, one or more actions may be performed. These actions include issuing an alert (to be reviewed by an authorized user), throttling, restricting, and/or stopping the user's write requests from being processed, and/or the user may be denied access to any of the one or more media storage devices 302. Moreover, the user may be placed in a list for further investigation based on the activities that elicited the restriction to write rate.

These user profiles may be based on a type of user, e.g., administrator, programmer, computer aided design (CAD) designer, casual or general user, gamer, etc. Each type of user has a specific media access and write rate associated with the activities are primarily performed for the type of user. For example, a gamer will access the media to retrieve in game content, followed by a write to store a recover point in the game. A CAD designer will write, frequently, large amounts of data to save a particular design in which changes are made. An administrator will access sections of the media storage devices 302 that are not accessible to other types of users. Many other types of user profiles may be defined to account for possibly hundreds of different user types, as would be understood by one of skill in the art upon reading the present descriptions.

In a further embodiment, a user profile may be calculated for each specific user over a period of active use of the system 300. For example, a specific access rate (read and write rate) may be determined for each user for a period of time (years of use, months of use, weeks of use, or days of use) preceding analysis of access request(s) issued by the user which exceed the established access rate. If a user profile has not been established, then a default profile may be applied, such as casual user by default. An algorithm of a type known in the art may be used to determine standard rates of reading and writing for all the media storage devices 302 and/or for a particular media storage device, such as the first media storage device 314. Moreover, throttling may be applied to write request(s) when a certain percent of normal write rate is matched or exceeded.

In addition, in another embodiment, write rates may be applied based on a time of day in which the write request(s) are received. Since more activity is expected during business hours, any write request(s) which are received outside of business hours may be restricted, throttled, and/or denied depending on the amount of write request(s) received, amount of data being manipulated, etc. For example, sectors 1-20 on the first media storage device 314 may have a normal write rate from 7:00 AM-5:00 PM (e.g., during business hours, full requested write rate or some upper limit may be allowed), but any requested write requests may be throttled or limited to 20% of a normal write rate from 1:00 AM-6:00 AM (e.g., during non-peak hours). In another example, all sectors on the first media storage device 314 may have a normal write rate from Monday-Friday (e.g., during business week, full requested write rate or some upper limit may be allowed), but any requested write requests may be throttled or limited to 10% of a normal write rate from Saturday-Sunday and on holidays (e.g., during non-business periods).

Moreover, according to another embodiment, write change expectations (a rate of change or amount of change) for a particular subset of storage space on any of the one or more media storage devices 302 may be considered in the application of write rate restrictions. For example, a maximum amount of characters may be changed in any particular subset of storage space based on the type of data stored to that subset of storage space, while a higher or lower amount of characters may be changed in other subsets of storage space based on the type of data stored there. In another embodiment, the expected rate of change may limit how many characters may be changed for any particular subset of storage space. For example, a write request may attempt to change 2000 characters in a first subset of storage space while only an expected change rate of 100 characters is allowed, which causes the write request to process more slowly, to limit its effect and allow for intervention to take place if the write request is deemed to be malicious.

Write rate restrictions may be applied based on a deviation between the write rate and an expected write rate based on one or more factors or considerations. Write rate restrictions may be applied linearly (an equal increase in write rate restriction for each increase in deviation from expected write rate), progressively (a greater amount of write rate restriction for an increase in deviation from expected write rate), exponentially, etc., for any subset of storage space, for any media storage device of the one or more media storage devices 302, for any application of the one or more applications 306, etc. In a further embodiment, thresholds may be created for an amount of data written, e.g., after 10 MB written, after 100 MB written, after 1 GB written, etc., such that write rates for a particular application, subset of storage space, and/or media storage device, are throttled more and more (reducing the write rate) after each of these successive thresholds are attained.

In another embodiment, an authorized user may override any write rate policy to allow higher write rates even when policies are violated, to allow for trusted sources to write as desired.

According to another embodiment, write rates across the one or more media storage devices 302 may be shifted over time to allow for purposes of wear leveling on the one or more media storage devices 302.

In yet another embodiment, the controller 304 or some other component of the system 300 (such as firmware on each of the one or more media storage devices 302) may be switchable between a secure and an unsecured mode, through a power-off process, that allows for any of the embodiments described herein to be halted or stopped, at least temporarily.

In this embodiment, a graphical user interface (GUI) may be provided to an authorized user to choose which mode to operate in, and to provide one or more unsecured boot modes. In various embodiments, the authorized user may reboot/power off the media storage device/computing device, the media storage device's name and/or ID may be changed for display by UEFI/BIOS, showing that the media storage device is in an unsecured mode.

Moreover, a delayed initialization may occur in unsecured mode, allowing additional time for the authorized user to notice that the device is not in the secure mode. This unsecured mode allows for formatting of the media storage devices 302. Any writes that occur to warning blocks will have their write rate monitored, and warning blocks which are written with repeatedly changing data (e.g., a page file or a quickly changing database) may be reallocated as non-warning blocks and new warning blocks may be established to lower the apparent write rate.

Once the established write rate of a warning block (or group of warning blocks) is achieved, the controller 304 may raise an exception to the OS, giving a user a method to determine that these actions are occurring on the media storage device.

In another embodiment, write frequency for non-empty blocks of data on the one or more media storage devices 302 may be tracked over time. The controller 304 may perform the tracking and/or some other component of the system 300 that is configured to report the tracking information to the controller 304.

In various embodiments, the tracking may take place individually for each block of data (or some other subdivision of storage space) on a particular media storage device, such as the first media storage device 314, for each of the one or more media storage devices 302, or overall for all media storage devices 302. This tracked block write frequency may be associated with a normalized score to be compared with scores that are calculated for newly received write requests in a further embodiment. In this may, data blocks and/or storage space subsets which are rarely written are assigned very high scores, whereas data blocks and/or storage space subsets that are written and/or overwritten on a more regular basis are assigned very low scores, or vice versa. The scores, as mentioned, may be normalized to a scale, such as 0-100, 0-10, −100 to 100, etc., such that it may be easily determined whether the data block and/or storage space subset is written or overwritten frequently or rarely. Once a specific score is achieved, the controller 304 may issue an alert, warning, and/or exception in response to receiving one or more write requests that do not fall within historical usage scores for one or more data blocks and/or storage space subsets. In addition, the affected media storage device may be restricted to being read-only instead of being able to be written to. Thereafter, a user may be engaged to determine whether to continue the requested writes or to move the media to a group marked as read-only and have remediation performed thereon to correct any unauthorized writes already performed. Non-critical scores, e.g., scores which do not cause writes to be paused and that are performed on media storage devices which do not indicate any unauthorized activity will decrement automatically over time, as this activity is deemed to be acceptable and proper. Critical scores, in one embodiment, remain at their elevated level until a privileged user approves the action (write to the particular media storage device).

In a further embodiment, an age of an existing subset of storage space (how long it has been since the subset of storage space was written) may be used to determine whether a write request which targets the existing subset of storage space to determine a risk level for this write request and calculate the associated score. A correlation that may be used dictates that the greater the age of the existing subset of storage space, the greater the score is for the write request which targets the existing subset of storage space. This is because any request to overwrite data which has been written and unchanged for a long period of time is suspicious and may be an attempted ransomware attack that is overwriting the existing data with encrypted data.

In another embodiment, a relative difference between multiple data access events may be used to determine the score assigned to a write request. This relative difference may be between a creation time and a last modification time for existing data that is attempting to be accessed by an application or possibly malicious code. Data files with the same creation and last write dates may have a higher calculated score than those which exhibit greater separation between creation and modification times. This is because a hallmark of ransomware attacks is the need to create new encrypted files based on read existing files.

In this embodiment, the degree of the difference between the creation time and the last modification time for existing data affects the score that is assigned to the write activity. In another approach, a score assigned may be based on sequential access of files, using the same metrics that are described above. Also, the scale of the scores assigned may be greater as the gap between creation and last modified dates is greater.

According to another embodiment, sequential write probability expectations may be assigned to one or more subsets of storage space based on a creation time stamp and gap(s) between the creation date and a last modification time stamp. Certain files that are stored sequentially on the one or more media storage devices 302 may typically be read and overwritten in a sequential manner. Therefore, the sequential use of these files should not produce an alert or be indicative of a ransomware attack. The controller 304 or some other component of the system 300 may handle determining these sequential write probability expectations and storing these sequential write probability expectations in association with the one or more subsets of storage space that are affected by these altered expectations. In this way, these subsets of storage space may be monitored on the firmware level for each media storage device for sequential probability expectations. One method of association is tagging, but any known association technique may be used. Moreover, these sequential write probability expectations may be used to calculate, on a small scale (each subset of storage space, e.g., sectors, tracks, data blocks, etc.), and based on the file content date score, a score based on write requests to those locations.

In another embodiment, a media storage device, such as the first media storage device 314, may be moved to a read-only list, by the controller 304 or some other component of the system 300, in response to a calculated score for the media storage device exceeding a predetermined score threshold.

In a further embodiment, any subset of storage space which is deemed to be read-only may be released for full write access in response to an authorized user providing input to either reduce the score (so that it falls below the threshold) or to zero the score entirely (reduce it to zero), as long as the authorized user has privileged access to the controller 304 or the one or more affected media storage devices, such as the first media storage device 314.

In a further embodiment, in response to detection of an overwrite attempt for existing data, the one or more media storage devices 302, the controller 304, or some other component of the system 300 may increment the score for affected media storage device(s), based on the age of the overwritten data blocks. In response to a media storage device's score achieving a certain threshold, further writes may be blocked or severely restricted.

Each score may be modified in firmware, at the controller 304, etc., with a tool which is not accessible from within the OS with a "user" authentication level. Non-critical scores may be decremented over time as a result of the activity being trusted. Moreover, an I/O driver may receive information from the media storage device about the write-lock status and/or high score, and may present a user with the option to zero the score with privileged access.

According to one embodiment, encryption-type behavior that occurs in response to one or more received write requests is detected and caused to stop or a write rate thereof restricted severely (to almost zero). In this way, unauthorized encryption may be suspended before all user files are inaccessible. Such behavior may be detected based on a pattern of the reads and writes. When encrypting data, typically, blocks of data are read, then blocks of data overwrite the previously-read blocks of data, in a cyclical fashion of reads and overwrites until all data is read and overwritten. This behavior is indicative of an encryption process, and may be reported and stopped before a substantial amount of data is encrypted, thereby foiling a possible ransomware attack which relies on encryption of data on the one or more media storage devices 302 to carry out its malicious intent.

This logic to detect patterns of suspicious write activity may exist on the firmware level for each of the one or more media storage devices 302 in one approach, and be configured to provide an interrupt to the OS. This logic to detect patterns of suspicious write activity may exist as a driver for the one or more media storage devices 302 in another approach, and be configured to provide an interrupt to the OS. The OS itself may include the logic to spot these patterns and interrupt to prevent malicious code form executing, and/or this logic to detect patterns of suspicious write activity may exist on the controller 304 in yet another approach.

Once a pattern similar to encryption has been established, the user may be prompted, and all write operations to the disk may be halted while awaiting authorized user approval to perform encryption-like work on the one or more media storage devices 302, or else the writes may be terminated to prevent harm to the one or more media storage devices 302.

In yet another embodiment, an alert may be issued to notify an administrator or some other authorized user about a write request which may be attempting to access data without proper authority and possibly perform malicious activity on the one or more media storage devices 302, such as encrypting data in a ransomware attack. This alert may be issued in response to any of the detection methods described above in various embodiments.

According to another embodiment, the one or more media storage devices 302, the controller 304, or some other component of the system 300 may have logic configured to detect formatting of the one or more media storage devices 302. Furthermore, in response to detected formatting, using standard filesystems, a timestamp is recorded. Moreover, each of the one or more media storage devices 302, the controller 304, or some other component of the system 300 may maintain a counter with a current score stored therein for each of the one or more media storage devices 302, and/or subsets of storage thereof. Each block of data may be written with a date stamp, but the format does not need to be 32 bit, as this resolution is unnecessary and space consuming.

Any of the embodiments described above may be carried out by the controller 304 in response to a request from a user, an administrator, or some other authorized manual request. In an alternate embodiment, the controller 304 may perform one or more of the above described embodiments prior to receiving a write request which may be issued from an unauthorized entity, such as a ransomware attack.

In a further embodiment, in order to ensure that all requests for data access on the one or more media storage devices 302 are properly analyzed by the controller 304, OS file system commands may be altered, modified, added to, or otherwise adjusted in order to be routed through the controller 304 if they are not already so routed, such that any request that seeks access to data stored to the media storage devices 302 may be reviewed by the controller 304.

In another embodiment, the controller 304 may be configured to determine any write requests that are directed to at least one of the one or more media storage devices 302, such that all write requests for these media storage devices are able to be analyzed by the controller 304 to determine if action should be taken to slow or stop a ransomware attack before it harms any more data.

Figure 4:
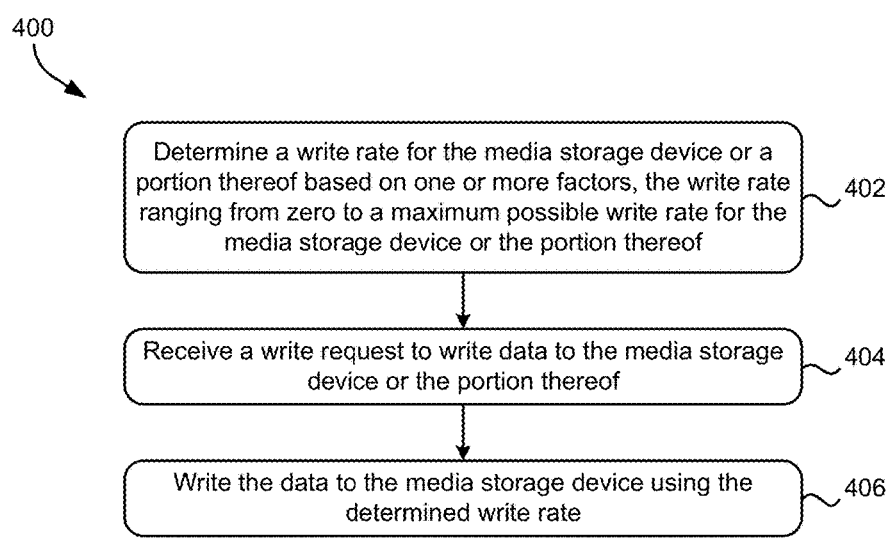
FIG. 4 is a flowchart of a method, according to one embodiment.

Now referring to FIG. 4, a flowchart of a method 400 is shown according to one embodiment. Method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of method 400 may be performed by any suitable component of the operating environment. For example, in various embodiments, method 400 may be partially or entirely performed by one or more devices of a network environment, or some other device having one or more processors therein. The processor, e.g., processing circuit(s), chip(s), and/or module(s) implemented in hardware and/or software, and preferably having at least one hardware component may be utilized in any device to perform one or more steps of method 400. Illustrative processors include, but are not limited to, a CPU, an ASIC, a FPGA, etc., combinations thereof, or any other suitable computing device known in the art.

As shown in FIG. 4, method 400 may initiate with operation 402, where a write rate for a media storage device or a portion thereof is determined based on one or more factors. The write rate may range from zero (indicating that writing is prevented from occurring) to a maximum possible write rate for the media storage device or the portion thereof. The maximum possible write rate is dependent upon many different circumstances, such as length and type of connections, protocols used, media storage device type, spin rates, requested data write size, new or overwrite request, bus speed, etc., and is a value that is conditional for any particular system arrangement and operating conditions.

The one or more factors may include, but are not limited to, any of the following characteristics and information: an identity of a source of the write request, a particular subset of storage space targeted by the write request, a media storage device that is targeted by the write request, an historical write rate for the particular subset of storage space on the media storage device, an amount of overwriting that has historically taken place due to write requests received from the source of the write request, a time at which the write request is received, and a pattern of write requests received from the source of the write request. Of course, any other factors described herein may be taken into consideration when determining the write rate, as would be understood by one of skill in the art upon reading the present descriptions.

In operation 404, a write request is received to write data to the media storage device or the portion thereof. Because the write request may specify a particular subset of storage space (the portion thereof) on which to write to the media storage device, method 400 may take this subset of storage space and characteristics of this subset of storage space into consideration when analyzing the write request.

The request may be a request to write new data to unoccupied space on the media storage device, or a request to overwrite existing data on the media storage device.

In operation 406, the data is written to the media storage device using the determined write rate. As mentioned earlier, the write rate may be zero, in which case data is not written to the media storage device at all. In this case, an error may be returned indicating that the data cannot be stored.

Method 400 may further include determining an overwrite rate for the media storage device or the portion thereof based on the one or more factors in addition to the write rate. These separate write and overwrite rates may be used to dictate how rapidly data may be stored to the media storage device anew (the write rate) and existing data may be overwritten on the media storage device (the overwrite rate), thereby allowing these rates to be applied separately for their corresponding write activity. Ransomware attacks typically overwrite data, and so the overwrite rate may be less than the write rate in most embodiments, sometimes by a factor of one half, one third, one fourth, or even one tenth the write rate.

In another embodiment, method 400 may include restricting the write rate (from an initial value) in response to determining an action that is indicative of a ransomware attack or malicious code executing on the media storage device. The action may include, but is not limited to, any of the following: a frequency of write activity on the media storage device or the portion thereof that exceeds a predetermined write frequency threshold, a rate of change resulting from the write request being greater than an historical rate of change for the media storage device or the portion thereof, and the write request being received outside of a time period in which write requests are expected to be received for the media storage device or the portion thereof. Of course, any other actions described herein that are indicative of a ransomware attack or malicious code executing on the media storage device may be taken into consideration when determining whether to restrict the write rate and by how much to restrict the write rate, as would be understood by one of skill in the art upon reading the present descriptions.

In another embodiment, method 400 may include tracking, over one or more periods of time, a write frequency for non-empty blocks of data on the media storage device or the portion thereof. In this way, one or more historical write frequencies may be determined for the media storage device or the portion thereof, which may be indicative of normal writing activity on the media storage device or the portion thereof.

In a further embodiment, method 400 may include calculating an historical score for the media storage device or the portion thereof based on the write frequency tracked over the period of time, possibly along with one or more other considerations as described herein according to multiple different embodiments. Moreover, method 400 may include calculating an instant score for the write request based on a write frequency resulting from performing the write request. This instant score indicates a write frequency that is being requested by the received write request and one or more other write requests issued for the media storage device or the portion thereof within a predetermined time frame (recently). Thereafter, based on a comparison of the instant write frequency with the one or more historical write frequencies, the write rate may be restricted in response to the instant score exceeding the historical score.

In another embodiment, the write rate may be determined based, at least in part, on a type of user who issued the write request or historical write rates to the media storage device or the portion thereof exploited by the user who issued the write request. Moreover, any of the other embodiments described herein regarding the determination of users and write rate assignment and restriction due to the type of user may be used in method 400.

Again, the presently disclosed inventive concepts may be embodied as methods, computer program products, and/or systems in various approaches. In one particular embodiment of a system configured to prevent or minimize ransomware attacks as described above with respect to method 400 and FIG. 4, a system includes a media storage device, a processor, and logic integrated with and/or executable by the processor to cause the processor to perform method 400.

In another embodiment, a computer program product may be configured to perform method 400 or some embodiment thereof. For example, the computer program product may include a computer readable medium having stored thereon computer readable program instructions executable by a processor to cause the processor to perform method 400.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a media storage device;
a processor; and
logic integrated with and/or executable by the processor, the logic being configured to cause the processor to:
determine a write rate for the media storage device or a portion thereof based on one or more factors, the write rate ranging from zero to a maximum possible write rate for the media storage device or the portion thereof;
determine an overwrite rate for the media storage device or the portion thereof based on the one or more factors;
receive a write request to write data to the media storage device or the portion thereof; and
write the data to the media storage device, wherein portions of the data written to empty blocks of memory on the media storage device are written using the determined write rate, wherein portions of the data written to non-empty blocks of memory on the media storage device are written using the determined overwrite rate.

2. The system as recited in claim 1, wherein the one or more factors comprise an identity of a source of the write request, a particular subset of storage space targeted by the write request, a media storage device that is targeted by the write request, an historical write rate for the particular subset of storage space on the media storage device, an amount of overwriting that has historically taken place due to write requests received from the source of the write request, a time at which the write request is received, and a pattern of write requests received from the source of the write request.

3. The system as recited in claim 1, wherein the logic is further configured to cause the processor to restrict the write rate from an initial value in response to determining an action selected from a group consisting of: a frequency of write activity on the media storage device or the portion thereof that exceeds a predetermined write frequency threshold, a rate of change resulting from the write request being greater than an historical rate of change for the media storage device or the portion thereof, and the write request being received outside of a time period in which write requests are expected to be received for the media storage device or the portion thereof.

4. The system as recited in claim 1, wherein the logic is further configured to cause the processor to track, over a period of time, a write frequency for non-empty blocks of data on the media storage device or the portion thereof.

5. The system as recited in claim 4, wherein the logic is further configured to cause the processor to:
calculate an historical score for the media storage device or the portion thereof based on the write frequency tracked over the period of time;
calculate an instant score for the write request based on a write frequency resulting from performing the write request; and
restrict the write rate in response to the instant score exceeding the historical score.

6. The system as recited in claim 1, wherein the write rate is determined based, at least in part, on a type of user who issued the write request or historical write rates to the media storage device or the portion thereof exploited by the user who issued the write request.

7. A computer program product comprising a computer readable medium having stored thereon computer readable program instructions executable by a processor to cause the processor to perform a method, the method comprising:
determining a write rate for a media storage device or a portion thereof based on one or more factors, the write rate ranging from zero to a maximum possible write rate for the media storage device or the portion thereof;
determine an overwrite rate for the media storage device or the portion thereof based on the one or more factors;
receiving a write request to write data to the media storage device or the portion thereof; and
writing the data to the media storage device, wherein portions of the data written to empty blocks of memory on the media storage device are written using the determined write rate, wherein portions of the data written to non-empty blocks of memory on the media storage device are written using the determined overwrite rate.

8. The computer program product as recited in claim 7, wherein the one or more factors comprise an identity of a source of the write request, a particular subset of storage space targeted by the write request, a media storage device that is targeted by the write request, an historical write rate for the particular subset of storage space on the media storage device, an amount of overwriting that has historically taken place due to write requests received from the source of the write request, a time at which the write request is received, and a pattern of write requests received from the source of the write request.

9. The computer program product as recited in claim 7, wherein the method further comprises restricting the write rate from an initial value in response to determining an action selected from a group consisting of: a frequency of write activity on the media storage device or the portion thereof that exceeds a predetermined write frequency threshold, a rate of change resulting from the write request being greater than an historical rate of change for the media storage device or the portion thereof, and the write request being received outside of a time period in which write requests are expected to be received for the media storage device or the portion thereof.

10. The computer program product as recited in claim 7, wherein the method further comprises tracking, over a period of time, a write frequency for non-empty blocks of data on the media storage device or the portion thereof.

11. The computer program product as recited in claim 10, wherein the method further comprises:
calculating an historical score for the media storage device or the portion thereof based on the write frequency tracked over the period of time;
calculating an instant score for the write request based on a write frequency resulting from performing the write request; and
restricting the write rate in response to the instant score exceeding the historical score.

12. The computer program product as recited in claim 7, wherein the write rate is determined based, at least in part, on a type of user who issued the write request or historical write rates to the media storage device or the portion thereof exploited by the user who issued the write request.

13. A computer-implemented method, comprising:
determining a write rate for a media storage device or a portion thereof based on one or more factors, the write rate ranging from zero to a maximum possible write rate for the media storage device or the portion thereof;
determining an overwrite rate for the media storage device or the portion thereof based on the one or more factors;
receiving a write request to write data to the media storage device or the portion thereof; and
writing the data to the media storage device, wherein portions of the data written to empty blocks of memory on the media storage device are written using the determined write rate, wherein portions of the data written to non-empty blocks of memory on the media storage device are written using the determined overwrite rate.

14. The computer-implemented method as recited in claim 13, further comprising:
returning an error indicating that the data cannot be stored in response to determining that the write rate is zero.

15. The computer-implemented method as recited in claim 13, wherein the one or more factors comprise an identity of a source of the write request, a particular subset of storage space targeted by the write request, a media storage device that is targeted by the write request, an historical write rate for the particular subset of storage space on the media storage device, an amount of overwriting that has historically taken place due to write requests received from the source of the write request, a time at which the write request is received, and a pattern of write requests received from the source of the write request.

16. The computer-implemented method as recited in claim 13, further comprising restricting the write rate from an initial value in response to determining an action selected from a group consisting of: a frequency of write activity on the media storage device or the portion thereof that exceeds a predetermined write frequency threshold, a rate of change resulting from the write request being greater than an historical rate of change for the media storage device or the portion thereof, and the write request being received outside of a time period in which write requests are expected to be received for the media storage device or the portion thereof.

17. The computer-implemented method as recited in claim 13, further comprising:
tracking, over a period of time, a write frequency for non-empty blocks of memory on the media storage device or the portion thereof;
calculating an historical score for the media storage device or the portion thereof based on the write frequency tracked over the period of time;
calculating an instant score for the write request based on a write frequency resulting from performing the write request; and restricting the write rate in response to the instant score exceeding the historical score.

18. The computer-implemented method as recited in claim 13, wherein the write rate is determined based, at least in part, on a type of user who issued the write request or historical write rates to the media storage device or the portion thereof exploited by the user who issued the write request.

\* \* \* \* \*